July 21, 1942.   H. D. STEVENS   2,290,627
APPARATUS FOR BUILDING TIRES
Filed Oct. 9, 1940   3 Sheets-Sheet 3
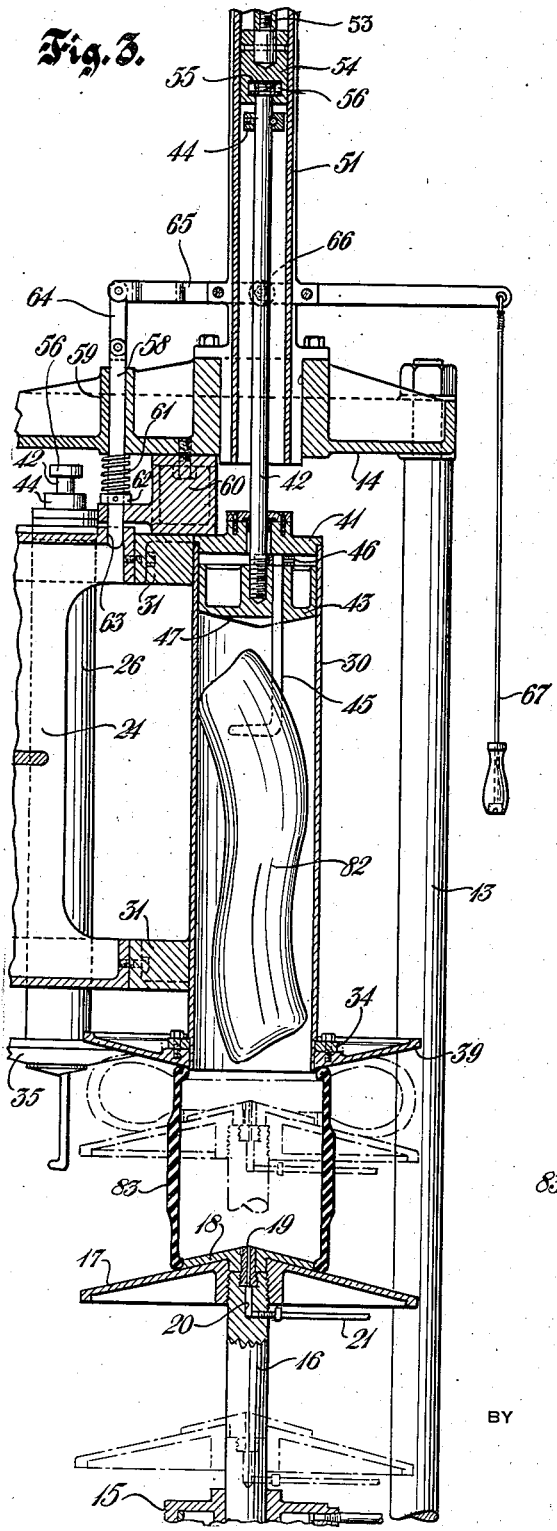
Fig. 3.
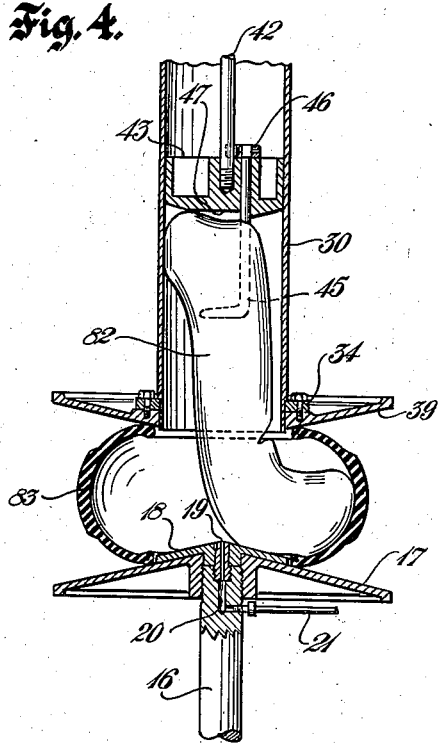
Fig. 4.
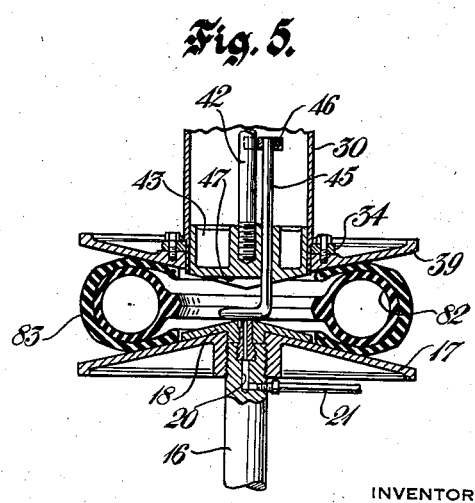
Fig. 5.
INVENTOR
Horace D. Stevens
BY
ATTORNEYS Patented July 21, 1942

2,290,627

UNITED STATES PATENT OFFICE 2,290,627

APPARATUS FOR BUILDING TIRES

Horace D. Stevens, Akron, Ohio, assignor to The Firestone Tire & Rubber Company, Akron, Ohio, a corporation of Ohio Application October 9, 1940, Serial No. 360,361

5 Claims. (Cl. 18—2)

This invention relates to apparatus for building tire casings, and more especially it relates to tire building apparatus for shaping pulley band or drum built tire casings to tire form, and for concurrently inserting flexible expansible cores therein.

Tire building apparatus of the character mentioned is expensive to manufacture, and is quite large and cumbersome, especially when used for the manufacture of the larger sizes of tires. Moreover, it is common practice to have separate apparatus for most of the various sizes of tires manufactured, so that equipment for the manufacture of a full range of sizes is almost prohibitive except to the larger manufacturers. Furthermore, it frequently happens that the production of certain tire sizes is not great enough to require the use of the particular tire building apparatus for an entire work-day, with the result that the apparatus at times must remain in non-productive idleness.

The chief objects of the invention are to provide apparatus of the character mentioned capable of shaping tire bands of a number of different sizes; to provide such an apparatus wherein change to adapt it to different size tires readily is effected; and to provide such apparatus requiring but few alternatively usable elements. Additional objects include the attaining of greater utility of the apparatus; the elimination of periods of idleness; and the saving in cost achieved by providing a single apparatus for doing work heretofore done by several. Other objects will be manifest as the description proceeds.

Of the accompanying drawings:

Figure 3 is a vertical section through the work-engaging portions of the apparatus, and the work therein, as they appear during an early phase of a cycle of operation;

Figure 4 is a sectional view of a portion of the structure shown in Figure 3, in a subsequent phase of operation; and Figure 5 is a view of the parts shown in Figure 4 in the final phase of operation.

Figure 1:
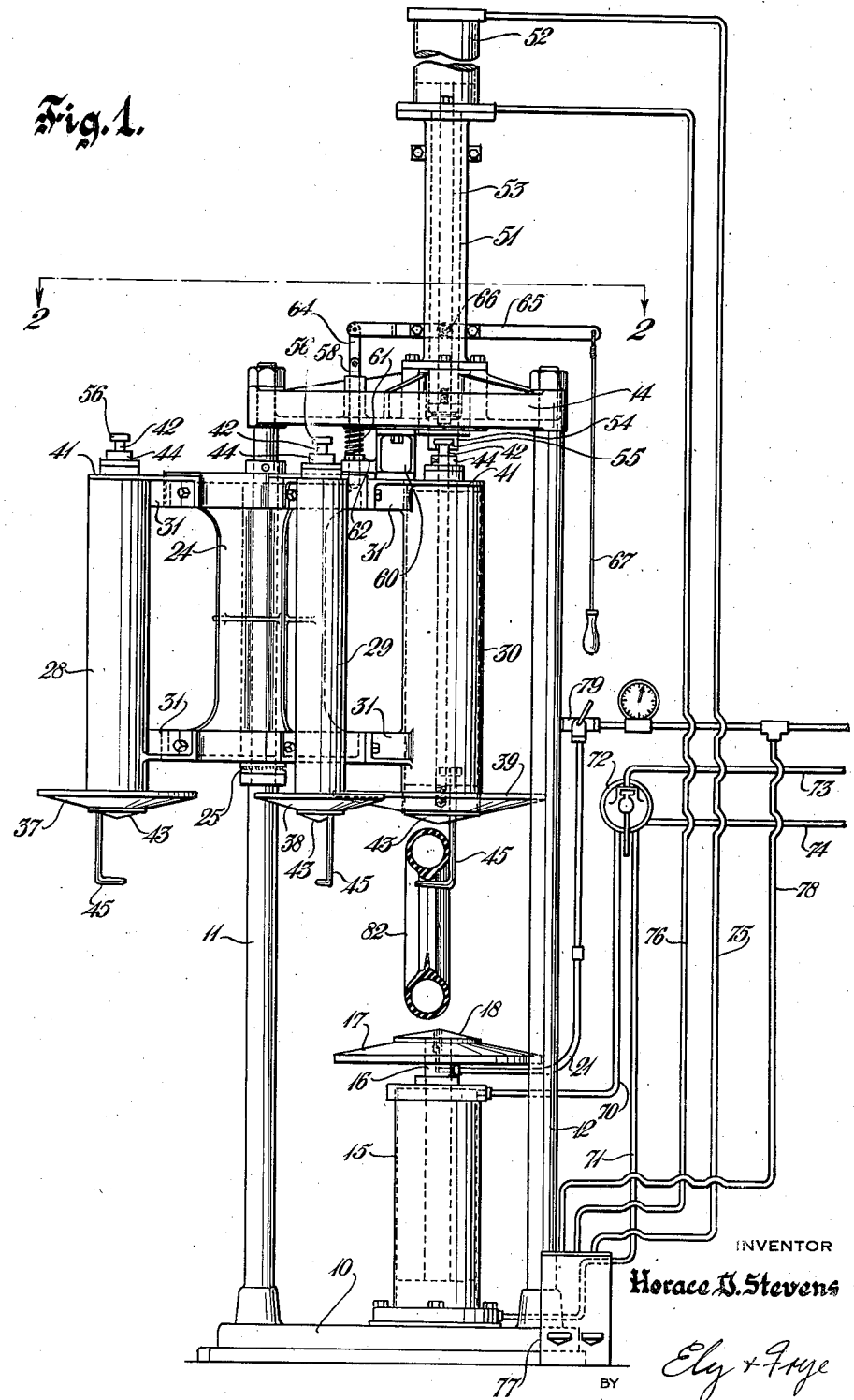
Figure 1 is a side elevation of tire building apparatus embodying the invention, in inoperative position, and an expansible core, in section, shown in association therewith in the position it occupies at the beginning of a cycle of operation of the apparatus.

Referring now to the drawings, there is shown an apparatus comprising a generally triangular base plate 10, and rising from the corners thereof are respective posts 11, 12, and 13 that support a triangular top plate 14 at their upper ends. Mounted upon the base plate 10, centrally thereof, is a vertically disposed double-acting fluid pressure operated cylinder 15 that has its piston rod 16 projecting from its upper end. Mounted upon the upper end of said piston rod is an axially apertured, frusto-conical, plate or lower head 17 adapted for engagement with the lower bead of a tire band during the operation of the apparatus. Superposed upon the head 17, concentrically thereof, is a conical adapter 18 of such thickness as to provide a marginal shoulder that constitutes a centering means for a tire band placed on the head 17, the adapter being receivable within the tire band. Several adapters 18 are provided, said adapters being usable alternatively for tire bands of different diameters. The adapter 18 is formed with an axial bore 19 that is in communication with an angular duct 20 formed in the upper end portion of the piston rod 16, and a flexible pipe 21 is connected at one end to the piston rod and adapted to discharge fluid under pressure into the duct 20, the other end of said pipe communicating with a source of pressure fluid, as subsequently will be explained.

Journaled upon the post 11, near the upper end thereof, is a turret 24, said turret resting upon a suitable bearing 25 carried by said post. Carried by the turret 24 is a circumferential series of tubes or hollow cylinders that are disposed on vertical axes, said cylinders being shown herein as five in number and designated 26, 27, 28, 29, and 30. All of said cylinders are of the same length, but are of different inside diameters. Each of said cylinders is provided at its upper and lower ends with respective brackets 31 by means of which the cylinder is attached to the turret 24, the brackets of each cylinder being of different length from the brackets of other cylinders, the arrangement being such that the axes of the several cylinders are equidistant from the axis of rotation of the turret 24, and move in a common orbit when the latter is rotated, which orbit intersects the extended vertical axis of the fluid pressure cylinder 15. The arrangement is such as to enable the cylinders 26 to 30 selectively to be positioned in axial alignment with the cylinder 15.

Mounted upon each of the cylinders 26 to 30, exteriorly thereof adjacent its lower end, is a circumferential flange, such as the flange 34, Figures 3 to 5 and mounted upon said flange is a frusto-conical annular plate or upper head. The heads of the cylinders are of different sizes in accordance with the different diameters of the cylinders 26 to 30, said heads being designated 35 to 39 respectively. The lower end portion of each cylinder 26 to 30 projects through the head thereon sufficiently to constitute a shoulder comparable to the shoulder provided by the margin of the adapter 18 of the lower head 17, and functioning in the same manner as said adapter with relation to the upper bead portion of a tire band in the apparatus. The shoulders formed by the lower ends of the cylinders 26 to 30 are of the same diameter as the respective adapters 18 provided for alternative use in the apparatus.

The cylinders 26 to 30 are open at their lower ends, but have their upper ends provided with respective caps or closures 41 that are identical except as to diameter. Each cap 41 is formed with a suitable stuffing box through which extends an axial push rod 42, the lower end of which is connected to a plunger 43 slidably mounted within the cylinder. The plungers 43 of the several cylinders are identical except as to diameter, and each has a slightly tapered or conical lower end. In the inoperative position of the apparatus the plungers 43 are disposed at the lower end of their cylinders, with their conical ends projecting below the same, the positions of said plungers being determined by stop collars 44 mounted upon the respective push rods 42 near the upper ends thereof. Each plunger 43 carries a hook 45 that is disposed below the plunger and is utilized, in the operation of the apparatus, for drawing a collapsed expansible core up into the interior of the cylinder in which the plunger is mounted. The hook 45 has a relatively long shank portion that is slidably mounted in the plunger eccentrically of the axis thereof and has its upper end, above the plunger, provided with a stop collar 46, the latter limiting the downward movement of the hook relatively of the plunger, but enabling the hook to rise, relatively of the plunger, upon occasion as subsequently will be explained. The hooks 45 of the several plungers are identical except that the angular portion at the lower end of each hook is longer in the hooks of the larger cylinders 26 to 30 than in those of smaller diameter. The hooks 45 in the several cylinders have their lower ends pointed in the direction of the axis of post 11, so that in the cylinder that is in axial alignment with cylinder 15 the hook 45 is directed toward the rear of the apparatus. For maintaining the hooks 45 at all times in proper angular position as described, the stop collar 46 of each hook is formed with a centrally recessed laterally projecting portion that partly embraces the adjacent push rod 42, as shown in Figures 3, 4, and 5. The bottom of each plunger 43 is formed with a transverse recess 47 in which the lower end of its hook 45 is received whenever the hook is forced to an extreme elevated position relatively of the plunger.

Figure 2:
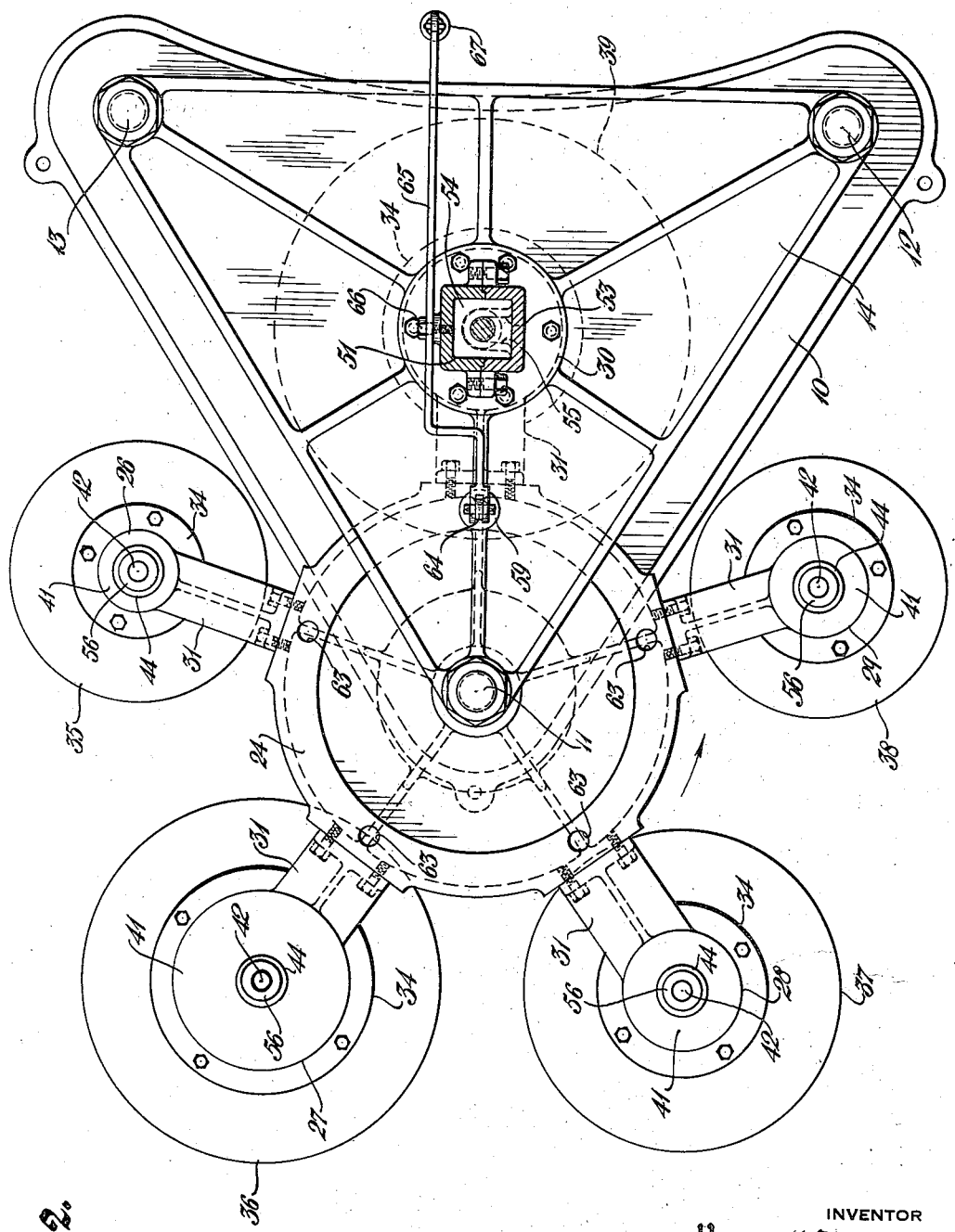
Figure 2 is a section, on a larger scale, on the line 2—2 of Figure 1 showing the major portion of the apparatus in plan.

To effect reciprocatory movement of the plungers 43, the push rods 42 are required to move upwardly through the top plate 14, and to this end the latter is formed with an aperture 50 that is in axial alignment with the cylinder 15 on the base plate 10. Mounted upon the top of the top plate 14, concentrically of the aperture 50, is a two-part, longitudinally divided, hollow guide structure 51 that is square in transverse section. Mounted upon the top of structure 51, coaxially thereof, is a double-acting fluid pressure operated cylinder 52 that has a piston rod 53 projecting downwardly from its lower end into the guide structure 51. The lower end of piston rod 53 has a connecting block 54 secured thereto, which block is square in section and slidably fits within the similarly shaped interior of the guide structure 51. The arrangement is such that the block 54 may be reciprocated by alternate charge and discharge of the opposite ends of cylinder 52. When the block 54 is in its lowermost position, as shown in Figure 1, a substantial portion of the block projects below the top plate 14 and extends into the orbit of the push rods 42, at the upper ends of the latter. The bottom of the block 54 is formed with an undercut recess 55 that opens onto a lateral face of said block, which face confronts the upper ends of the push rods 42 when the turret 24 is rotated in counter-clockwise direction as indicated by the arrow in Figure 2. The upper end of each of said push rods 42 is provided with a collar or flange 56, and said collar is receivable in the undercut portion of recess 55 of the block 54 when a push-rod 42 is in axial alignment with the piston rod 53 and connecting block 54. The arrangement is such as to enable the piston rod 53 readily to be operatively connected selectively to any of the push-rods 42, whereby the fluid pressure cylinder 52 may be utilized to reciprocate said rods and the plungers 43 connected thereto.

Means is provided for locking the turret 24 in any of its angular positions wherein any of its cylinders 26 to 30 is axially aligned with the fluid pressure cylinders 15 and 52, which means comprises a vertically disposed locking pin 58 that is slidably mounted in an apertured boss 59 on the top plate 14. Mounted upon the under side of the said top plate is a bracket structure 60 that is formed with a laterally projecting apertured ear through which the pin 58 slidingly extends, said pin being guided thereby. The pin normally is urged downwardly by a compression spring 61 that encircles a pin, one end of said spring bearing against the underside of the top plate and the other end of the spring bearing against a collar 62 fixed on the pin. The collar 62 normally abuts the apertured ear of the bracket 60 and thus limits the downward movement of the pin 58 under the impetus of the spring 61. The pin 58 is receivable selectively in any one of a circumferential series of apertures 63, 63 that are formed in the top of turret 24, said apertures being properly positioned with relation to the respective cylinders 26 to 30 so that when the pin 58 is in an aperture 63 one of said cylinders will be in axial alignment with cylinders 15 and 52. Pin 58 is arranged to be lifted from the apertures 63 manually, and to this end a link 64 pivotally connects the upper end of the pin to one end of an operating lever 65. The latter has its intermediate region pivotally mounted at 66 upon the guide structure 51, the free end of the lever extending to the front of the apparatus and provided with a pull rod and handle 67. As is clearly shown in Figures 1 and 3, the bottom face of the bracket structure 60 is so positioned that it is lightly in contact with the top of the upper bracket 31 of the cylinder 26 to 30 that is in operative position in alignment with cylinders 15 and 52. Thus, the bracket structure 60 serves to reinforce said bracket 31 against the strains incidental to the pulling of a collapsed core up into any cylinder that is in operative position.

The piping of the fluid pressure operated elements of the apparatus is shown in Figure 1 to which attention now is directed. The hydraulically operated cylinder 15 has the upper end of its chamber provided with a fluid inlet-and-outlet pipe 70, and has its lower end similarly provided with a fluid inlet-and-outlet pipe 71 which pipes extend to a manually operable 4-way valve 72. The latter is connected to a supply pipe 73 of hydraulic fluid at about 250 lbs. pressure, and to an exhaust pipe 74. Thus by means of valve 72, pressure fluid may be admitted to either end of cylinder 15 and concurrently exhausted from the opposite end to raise and lower the piston rod 16 thereof. In like manner the upper end of cylinder 52 is provided with an inlet-and-outlet pipe 75 and the lower end is provided with a similar pipe 76. Pipes 75 and 76 extend to a 4-way foot-operated valve 77. The latter is provided with an exhaust pipe (not shown) and with a supply pipe 78 that extends to a suitable source (not shown) of pneumatic fluid under about 80 lbs. pressure. Pipe 21, through which air under pressure is discharged through the lower head 17 of the apparatus and into a tire band in the apparatus, is connected to the supply pipe 78, said pipe 21 including a 3-way manually operable valve 79 for controlling the flow of air to and from said lower head 17.

The operation of the apparatus is as follows. As shown in the drawings by way of example, it is the cylinder 30 that is operatively positioned between the cylinders 15 and 52, the collar on the upper end of push rod 42 of cylinder 30 being interlocked with connecting block 54 on the lower end of piston rod 53 of cylinder 52. The upper end of the latter cylinder is charged so that the plunger 43 of cylinder 30 is at the bottom thereof, the hook 45 projecting well below said plunger. The adapter 18 on lower head 17 is of the proper diameter for use when cylinder 30 is to be operatively utilized. With the various elements of the apparatus in the relative positions mentioned, an operator standing at the front of the apparatus, which is at the right side of the latter as viewed in Figures 1 and 2, hangs a hollow, flexible, annular expansible core 82 upon the hook 45 of cylinder 30, and operates the proper pedal of valve 77 to charge the lower end of cylinder 52, thereby causing the plunger 43 to rise. As the rising plunger pulls the hook 45 upwardly, the operator pulls the lower part of core 82 forwardly so that the core assumes a determinate position as it is collapsed, folded, and drawn up into the cylinder 30, its position in the latter being shown in Figure 3.

The operator next mounts a tire band 83 upon lower head 17, and then operates valve 72 to charge the lower end of cylinder 15 and thereby to elevate piston rod 16 and lower head 17. This movement of the lower head carries the upper end of tire band 83 into engagement with upper head 39, as shown in Figure 3, and immediately before such engagement is made the operator opens valve 79 to admit air under pressure to the interior of the tire band. As the head 17 continues to ascend, the increasing pressure of the air within the tire band forces the medial region of the latter outwardly so that the band assumes the general shape of a tire. The head 17 rises to its extreme elevation, as shown in broken lines in Figure 3, after which the operator lowers the said head to the position shown in Figure 4, thereby spreading apart the bead portions of the tire to considerable extent. The operator then reverses valve 77 to charge the upper end of cylinder 52 with the result that plunger 43 in cylinder 30 is caused to move downwardly. This brings the plunger into engagement with the upper end of collapsed core 82 in said cylinder, and said plunger forces said core endwise from the bottom of the cylinder. As the core emerges from the bottom of the cylinder it strikes the conical adapter 18 and is deflected laterally thereby so that it moves toward the interior of the tire. As more of the core enters the tire, the inherent stiffness of the core causes it progressively to assume its normal circular form and thus progressively to fill the tire. When the plunger 43 reaches its lowermost position, the core 82 is completely ejected from the cylinder 30 and is entirely within the tire 83, where it assumes its normal shape, thus freeing itself from the hook 45.

The operator then elevates the lower head 17 again to cause the core to nest snugly within the tire, the hook 45 moving upwardly relatively of the plunger 43, as shown in Figure 5, during this operation. The operator then reverses the valve 72 to lower the head 17, and reverses the valve 79 to shut off the flow of air through said head. When the head reaches its lowermost position the shaped tire with core therein may be removed therefrom. This completes a cycle of operations which may be repeated as desired.

When it is desired to utilize the apparatus for shaping tires of a different size it is only necessary to lift the locking pin 58, disengage the push rod 42 from connecting block 54, turn the turret 24 until the desired cylinder 26 to 29 is in axial alignment with the cylinders 15 and 52, effect connection of the plunger rod 42 with said connecting block, and release locking pin 58. Thereafter an adapter 18 of proper size is substituted for the adapter previously used.

The invention is of great utility since it enables a single apparatus to perform, alternatively, what heretofore has required a plurality of machines to accomplish. The invention results in the saving of valuable floor space, and achieves the other advantages set out in the foregoing statement of objects.

Modification may be resorted to without departing from the spirit of the invention, or the scope thereof as defined by the appended claims.

What is claimed is:

1. In an apparatus of the character described, the combination of a pair of relatively movable superposed heads adapted to engage a tire band at the respective margins thereof, a hollow open-ended cylinder on which one of said heads is mounted, and means in the cylinder for drawing a collapsed expansible core thereinto through the open end thereof and for subsequently ejecting it therefrom said cylinder having its open end extending through an axial opening in the head and projecting therefrom, said projecting portion of the cylinder constituting a shoulder for assisting in centering the tire band as it is engaged by said head.

2. A combination as defined in claim 1 including a removable adapter mounted upon the lower head and having a marginal shoulder constituting a means for centering a tire band relatively of the lower head.

3. In apparatus of the character described, the combination of a pair of relatively movable, opposed heads adapted to engage a flat band tire at the margins thereof, a coaxial hollow cylinder connected to one of said heads, and means in said cylinder for drawing a collapsed expansible core into said cylinder and for subsequently expelling it therefrom, said means comprising an axially reciprocable plunger in said cylinder, and a hook carried by said plunger and freely movable relatively thereof parallel to the axis of the plunger during operation of the apparatus.

4. In apparatus of the character described, the combination of a pair of relatively movable, opposed heads adapted to engage a flat tire band at the margins thereof, a coaxial hollow cylinder connected to one of said heads, and means in said cylinder for drawing a collapsed expansible core into said cylinder and for subsequently expelling it therefrom, said means comprising an axially reciprocable plunger, and a hook having a shank extending through a bore in said plunger and slidable relatively of the latter during operation of the apparatus, said bore being parallel to the axis of the plunger and laterally offset therefrom.

5. A combination as defined in claim 4 including means on the shank of the hook above the plunger preventing angular movement of the hook with relation to the plunger.

HORACE D. STEVENS.